Figure 8:
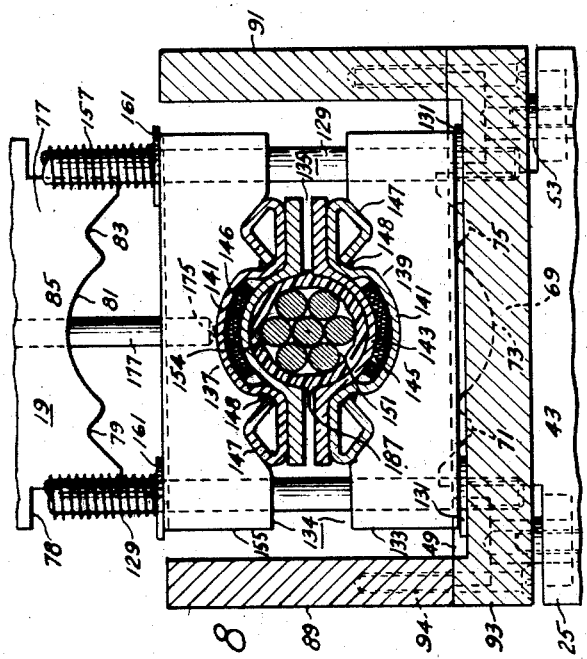

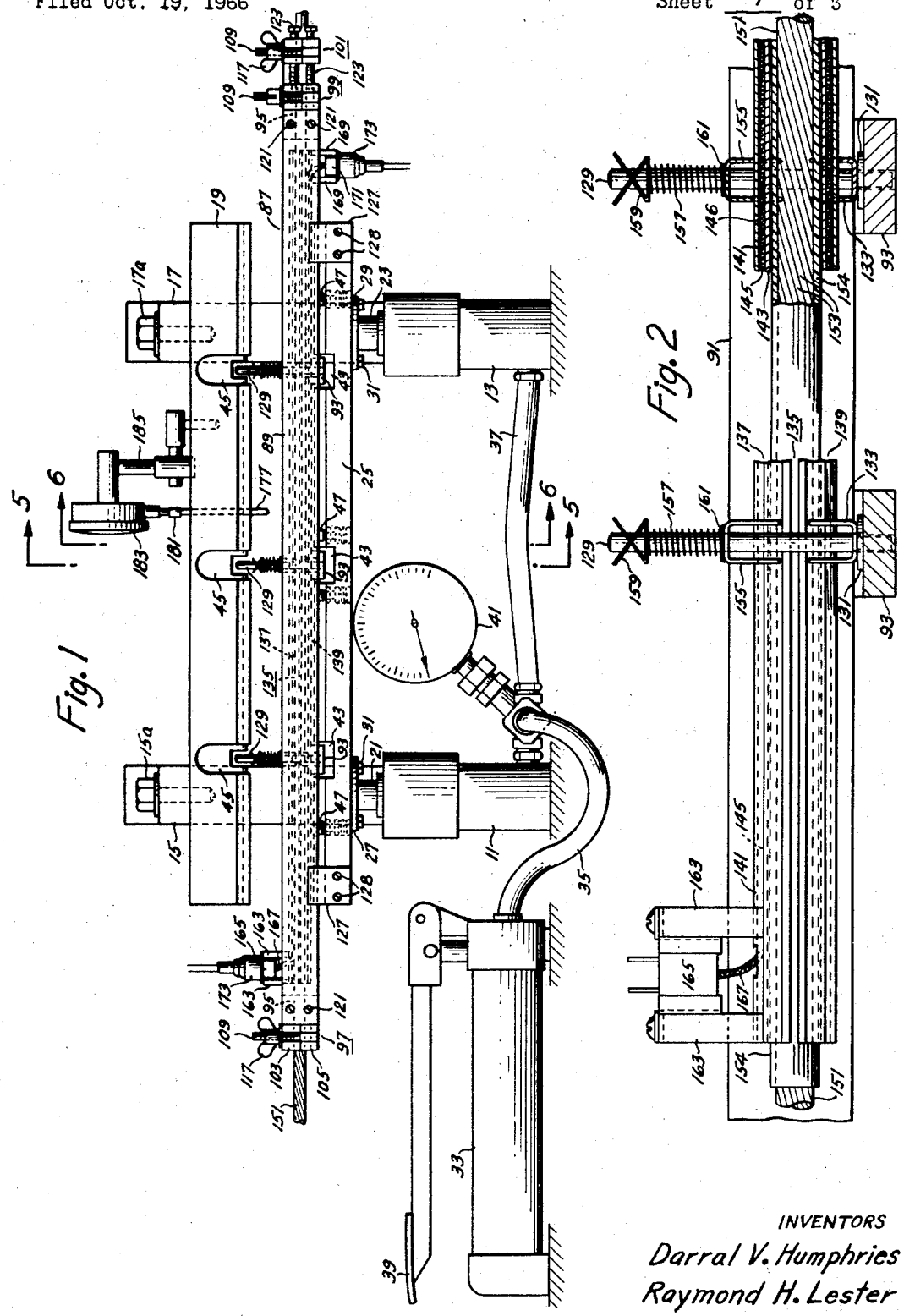

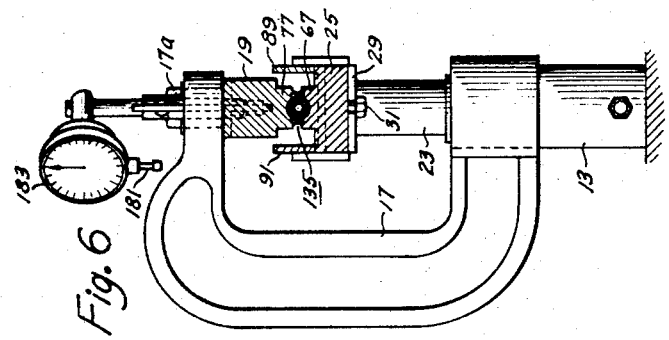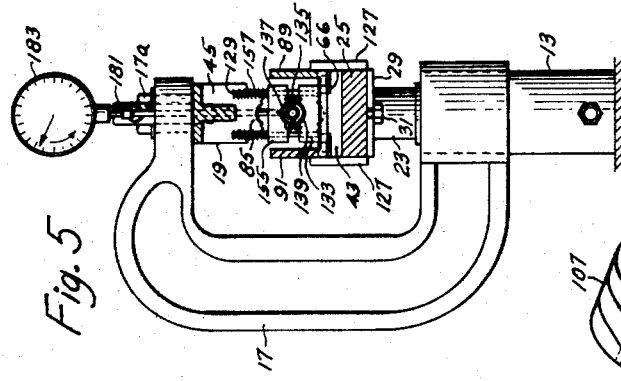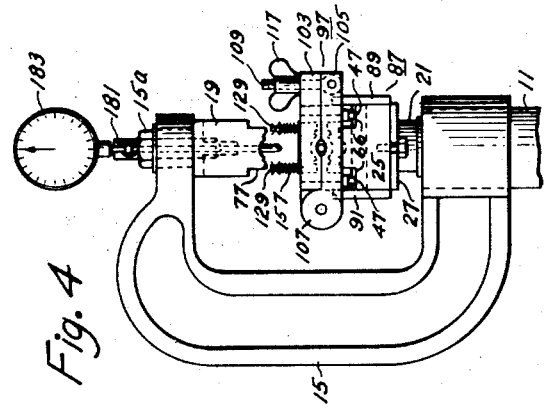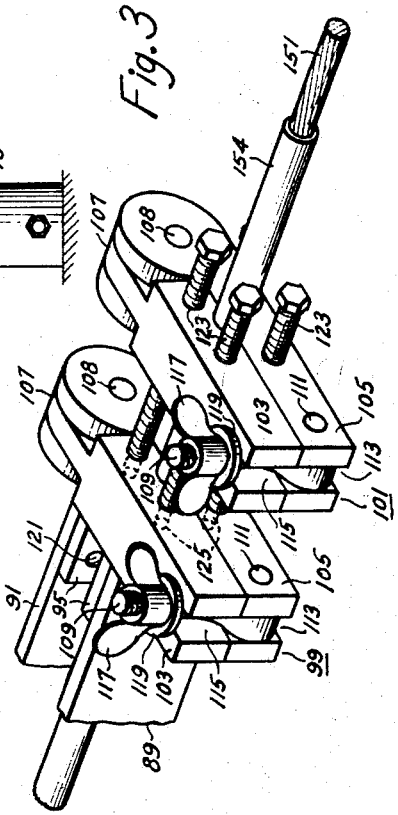

INVENTORS
Darral V. Humphries
Raymond H. Lester

United States Patent Office 3,430,293
Patented Mar. 4, 1969

3,430,293
COLD MOLDING OF NYLON ON CAN
CONVEYOR ROPE
Darral V. Humphries, Allentown, and Raymond H. Lester, Bethlehem, Pa., assignors to Bethlehem Steel Corporation, a corporation of Delaware
Filed Oct. 19, 1966, Ser. No. 587,865
U.S. Cl. 18—17                8 Claims
Int. Cl. B29h 5/00

This invention relates to plastic molding, and more particularly to plastic molding in molds designed to be quickly heated and cooled.

In the past it has been found difficult to effectively determine when heated plastic has reached the correct temperature for cold molding, i.e. for the application of cooling and molding pressure to mold and cool the article being fabricated. Difficulty has also been encountered in molding plastic over elongated objects formed from other materials such as steel. and particularly over wire rope and the like. It has been found very difficult, if not impossible, to obtain uniform coatings on such products, either from place to place on the same object, or between succeeding coated objects, due to poor heat control, poor positioning of the object as it is being molded, and poor control of the spreading of the plastic in the mold.

More particularly, in the making of splices in plastic coated wire rope it is necessary to remove the plastic from the area of the splice. The area of the splice must then be recoated after splicing. It is difficult to make a good recoating particularly in the field. If nylon is used it has a critical heating temperature. The melting temperatures of many types of nylon depend on variables such as the plasticizer and moisture content. A time-temperature relationship cannot be relied upon as an efficient criterion of moldability, particularly since even modest overheating of the nylon leads to a loss of plasticizer and a poor quality molding.

It is an object of this invention to provide an apparatus for molding in which the actual molding condition of the plastic is simply determined prior to beginning of the molding cycle.

It is a further object of the present invention to provide apparatus for molding plastic on flexible elongated objects in which the object on which the plastic is molded is precisely positioned in the mold and in which the molding of the plastic is controlled by the construction of the mold to provide a uniform coating upon the surface of the flexible object.

We have discovered that the foregoing objects can be attained by providing a molding apparatus and method of operation in which the correct plasticity of the plastic for molding can be detected by slight movements of the mold as the plastic reaches the correct molding temperature, by providing a mold in which a flexible member to be coated may be tensioned in order to attain and maintain correct position in the mold to provide concentric, void free coatings, and in which uniform heating of the mold is combined with provision for controlled overflow or extrusion from the mold in order to provide uniform flow of plastic around the article being plastic coated.

Referring to the drawings:
FIGURE 1 is an elevation of the molding apparatus as a whole.
FIGURE 2 is an enlarged elevation of a portion of the molding apparatus shown in FIGURE 1 with portions broken away to illustrate particular parts.
FIGURE 3 is an isometric view of the end of a portion of the molding apparatus shown in FIGURE 1.
FIGURE 4 is an end elevation of the major portion of the apparatus shown in FIGURE 1.

Figure 9:
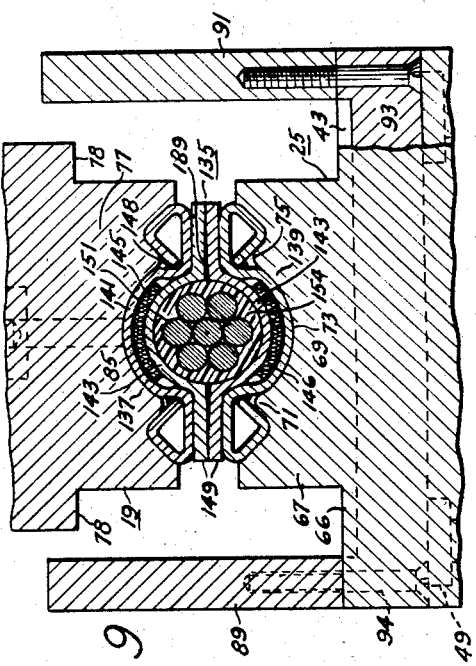
Figure 7:
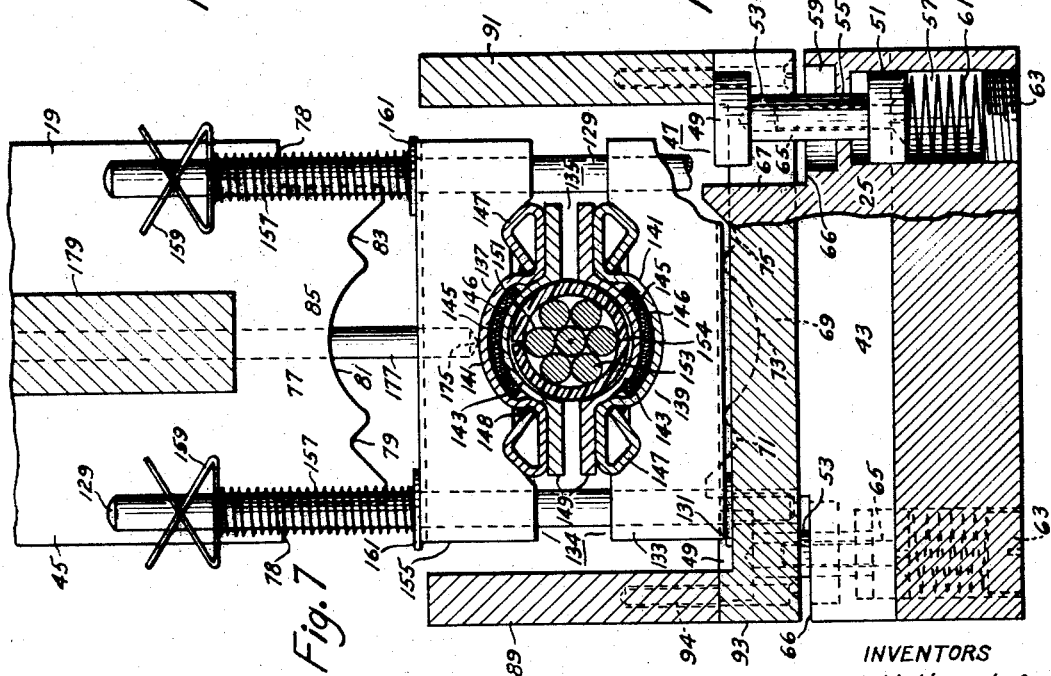

FIGURE 5 is a view of the apparatus shown in FIGURE 1 at the initiation of a heating cycle with a portion sectioned along 5—5.
FIGURE 6 is a view of the apparatus shown in FIGURE 1 at the conclusion of a molding cycle with a portion sectioned along 6—6.
FIGURE 7 is an enlarged section of a portion of FIGURE 5 with parts broken away to show detail.
FIGURE 8 is a section corresponding to FIGURE 7 at the conclusion of a heating cycle with parts omitted.
FIGURE 9 is an enlarged section of a portion of FIGURE 6.

Referring more particularly to the drawings, two pressure cylinders 11 and 13 support C-type structural supports 15 and 17 which in turn support a relatively massive upper cold mold 19 in a fixed position over cylinders 11 and 13. Bolts 15a and 17a secure mold 19 to supports 15 and 17. Piston rods 21 and 23 attached to pistons, not shown, within cylinders 11 and 13 movably support a lower cold mold 25 secured to the pistons 21 and 23 through flanges 27 and 29 and bolts 31. When fluid pressure of a suitable form is applied to cylinders 11 and 13 from pump cylinder 33 through connecting hoses 35 and 37 by the operation of foot treadle 39, the movement of the pistons in cylinders 11 and 13 will raise lower cold mold 25 toward the fixed cold mold 19. The pressure in the cylinders may be monitored on pressure gage 41. Three transverse notches 43 are cut into lower cold mold 25 and three U-shaped notches 45 are cut into upper cold mold 19 opposite the notches 43 for a purpose which will presently be made clear. A series of spring supports 47 each comprised of a support head 49 and a pressure plate 51 connected by a shank 53 which extends through an orifice 55, are shown in detail in FIGURE 7. Orifice 55 connects a cavity 57 in the body of lower cold mold 25 with a depression 59 in the surface of shoulder 66 thereof of sufficient diameter to accommodate the head 49 of spring support 47 when it is depressed. A spring 61 is located under pressure plate 51 in cavity 57 which is closed by a screw plug 63. Spring 61 acts to urge the head 49 of spring support 47 away from the surface of the shoulder 66 of lower cold mold 25. Pressure plate 51 of spring support 47 is secured to shank 53 by a machine screw 65 shown in dotted outline in FIGURE 7. The central top portion 67 of lower mold 25 extends above the shoulders 66 of the mold as most clearly shown in FIGURES 7 and 9 and the upper surface 69 of top portion 67 has three lengthwise depressions 71, 73 and 75.

The bottom central section 77 of upper mold 19 likewise extends beyond the shoulders 78 of the upper mold and also has three longitudinal depressions 79, 81, and 83 on the lower surface 85 thereof.

A frame 87 is supported upon spring supports 47 as shown in FIGURE 1. Frame 87 is formed from two side rails 89 and 91 secured together in spaced relationship by three shallow U-shaped tie plates 93 secured to side rails 89 and 91 by means of fastenings 94 shown in dotted outline in FIGURES 7, 8 and 9. Side rails 89 and 91 are secured together at the ends also by brackets 95 on clamps 97 and 99. Clamp 99 with brackets 95 is best shown in FIGURE 3. It will be understood that clamp 97 is substantially indentical to clamp 99 but has brackets 95 on the opposite side from their position on clamp 99. An additional clamp 101 is located adjacent clamp 99 as more clearly shown in FIGURE 3. The major components of clamps 97, 99, and 101 are all substantially identical, comprising an upper and a lower jaw, 103 and 105 respectively, movably connected by a hinge 107 pivoting about hinge pin 108. The jaws 103 and 105 of the clamps are drawn tightly together when desired by means of toggle bolts 109 pivoted on pins 111 within groove 113 in the lower jaws 105 of the clamps. When the clamps are to be set the jaws 103 and 105 are closed, the toggle bolt 109 is pivoted up until it enters groove 115 in the upper jaw 103 and wing nut 117 is screwed down until it bears through washer 119 upon the top jaw 103 with any desired force.

As noted supra, flanges 95 are mounted on appropriate sides of clamps 97 and 99 to secure them to side rails 89 and 91 and also aid in connecting the side rails together. Flanges 95 are connected only to the lower jaws 105 of clamps 97 and 99, leaving the upper jaws 103 free to pivot upwardly on their hinges. The side rails 89 and 91 are secured to flanges 95 by means of fastenings 121.

Clamp 101 does not have attached flanges 95 but instead is mounted upon the side of clamp 99 by means of four machine bolts 123, two of which are threaded through the upper jaw 103 of clamp 101 and extend partially into the upper jaw of clamp 99 and two of which are threaded through the lower jaw 105 of clamp 101 and extend partially into the lower jaw of clamp 99. It will be noted that with this construction the jaws of both clamps may be separated simultaneously. However, if it is desired to separate or clamp the jaws of only one of the clamps at a time the bolts 123 in the upper jaw of clamp 101 may be backed out of the upper jaw of clamp 99 enabling said upper jaws to operate independently. The ends 125, shown in dotted outline, of bolts 123 are smooth rather than threaded and extend into unthreaded openings in the jaws 103 and 105 of clamp 99. Rotation of bolts 123 will therefore cause clamp 101 to be positioned either nearer or farther from clamp 99 and clamp 101 can also be quickly separated from clamp 99 and frame 87 if desired.

Frame 87 is designed, as mentioned previously, to rest on top of spring supports 47 as seen in FIGURE 1 with four spring supports 47 supporting each of the side rails 89 and 91 in a manner shown individually for one spring support in a broken away section in FIGURE 7. The spring pressure of the eight spring supports 47 is sufficient to keep the frame 87 and the various associated structures therein, presently to be described, elevated above the surface of the lower cold mold when the molds are open. Tieplates 93 are centered in notches 43 in lower cold mold 25 and prevent longitudinal movement of frame 87 while flanges 127 secured by fastenings 128 to the outside of lower mold 25 near the ends of the mold extend upwardly and prevent frame 87 from being displaced sidewise from lower mold 25.

As shown most clearly in FIGURE 7 two guide pins 129 are mounted in each tie plate 93. A washer 131 is placed over each pin and a yoke 133 of a yoke clamp 134 rests upon washers 131 with the guide pins 129 extending up through suitable opening in the yoke 133. The top of the yoke is suitably cut out in a pattern similar to a transverse section through longitudinal grooves 71, 73 and 75 in the top surface 69 of lower mold 25, and accommodates the lower surface of the lower half 139 of a split heating mold 135.

The two halves 137 and 139 of heating mold 135 are each comprised of an outer stainless steel shell 141, an inner heat conducting copper lining 143, and an intermediate ribbon type electrical heating element 145 positioned in a central space between the shell 141 and lining 143. A thin insulating ribbon 146 is placed between heating element 145 and shell 141 to decrease heat transfer at this point. The sides of the stainless steel shell 141 extend beyond the inner lining 143 and are turned back upon themselves and secured, preferably by welds 148, as shown in FIGURE 7 to form reinforcing ribs 147 extending along each side of the lower half 139 of the heating mold adjacent outwardly extending flanges 149 of the heat conducting copper lining 143 to obtain a stiff section of low mass. The upper half 137 of heating mold 135 is identical in construction with the lower half 139 and the same reference numerals have been used to refer to parts therein.

The two halves 137 and 139 of the heating mold 135 surround an elongated object which is to be coated with plastic. For example, as shown in the figures, the elongated object may comprise a wire strand or a wire rope 151 comprised of individual wires or strands 153 as the case may be around which is placed a split tube 154 or tape wrapping of some suitable plastic, such as nylon, with which it is desired to coat the rope or strand.

An upper yoke 155 identical with lower yoke 133 of yoke clamp 134 is placed over guide pins 129 in the same manner as lower yoke 133 but in a reversed position to accommodate the upper surface of the heating mold. Two springs 157 are placed over guide pins 129 and restrained in place with any desired potential extension force by speed nuts 159 of any suitable construction which grip the sides of guide pins 129. Springs 157 bear down on the top of upper yoke 155 of yoke clamp 134 through washers 161. It will be seen in FIGURE 7 that the upper half 137 of the heating mold is urged continuously towards the lower half 139 of the heating mold by the action of springs 157 so that the plastic surrounding the wire rope 151 tends to be compressed within the mold.

At the left end of the upper half 137 of heating mold 135 two brackets 163 attached to the shell 141 of the mold support an electrical plug 165 from which a wire 167 connected to heating element 145 conducts current to the heating element. Likewise on the lower half 139 of the heating mold two brackets 169 support a plug 171 connected with the lower heating element 145. The heating elements 145 in both mold halves are designed with more coils per inch towards the extremities of the heating mold sections to compensate for greater heat escape near the ends due both to escape of heat from the mold sections themselves into the surroundings, and particularly to compensate for heat which is conducted away from the area of molding by the metal of the rope which extends beyond the area of coating. Electrical socket 173 may be attached to plugs 165 and 171 to provide heating current.

It will be noted in FIGURES 7 and 8 that the upper surface 69 of the lower cold mold 25 and the lower surface 85 of upper cold mold 19 do not contact the outside surfaces of heating mold 135 during heating of the mold. During this time the end 175 of contact pin 177 rests on top of shell 141 of the upper half 137 of heating mold 135. Contact pin 177 extends upwardly through an opening in the depending mold section 179 in notch 45 in upper cold mold 19 and continues through the main body of cold mold 19 to contact the feeler pin 181 of a dial gauge 183 mounted upon a universal gauge mounting 185 which is in turn mounted upon the upper surface of upper cold mold 19. Dial gauge 183 will detect any vertical movement of shell 141 of the upper half 137 of heating mold 135 through the intermediate contact pin 177.

The operation of the molding apparatus will now be explained with respect to nylon coating of spliced areas in nylon coated wire ropes, a use for which the present apparatus has been found particularly useful.

In the recoating of a spliced section of wire rope with a plastic such as a medium high temperature melting nylon, the spliced area to be recoated is suitably cleaned and a split nylon tube 154 is placed over the area. The rope section with the nylon tube 154 surrounding it is then placed in the lower half 139 of heating mold 135 as it rests on yokes 133 in frame 87 and the upper half 137 of the mold is placed upon it. The size of the heating mold 135 should be such that the central cavity inside dimensions are smaller than the outside dimensions of the rope with the unheated plastic about it as shown in FIGURE 7.

Clamps 97, 99 and 101 are next closed over the ends of the rope protruding from the mold and the wing nuts 117 of clamps 97 and 101 are tightened down in order to grip the ends of the rope securely. Bolts 123 in clamp 101 are next rotated in an appropriate direction to move clamp 101 away from clamp 99 and consequently tension the rope 151 between clamps 97 and 101. This straightens and centers rope 151 in the heating mold, ensures a final concentric plastic coating and hinders the escape of volatile materials from the organic rope core during the heating cycle which can lead to voids in the molded coating. After rope 151 is tensioned clamp 99 is preferably also drawn tightly against the rope although this is not strictly necessary. Alternately, if desired, the upper half 137 of the heating mold 135 may be placed over the rope subsequent to clamping the rope rather than prior to clamping as described. In either event upper yokes 155 are next placed over the upper half 137 of the heating mold 135 on guide pins 129, washers 161 and springs 157 are placed over guide pins 129 and speed nuts 159 are slid over the ends of guide pins 129 and clamped to the guide pins to compress springs 157 sufficiently to provide a moderate downward force on yoke 155 of yoke clamps 134.

Frame 87 with the closed heating mold 135 and tensioned rope 151 contained therein may now be placed on spring supports 47 in the lower cold mold 25 centered transversely between flanges 127 and longitudinally with tie plates 93 in notches 43. Foot pump 33 will then be operated to raise the lower cold mold 25 through the action of the pistons in cylinders 11 and 13 attached to piston rods 21 and 23 until the cold molds 19 and 25 are approximately in the position shown in FIGURES 5, 7 and 8. Guide pins 129 will in this position extend into notches 45 in the upper cold mold 19. Contact pin 177 is then placed in position with its lower end 175 resting on the top surface of the upper half 137 of heating mold 135 as shown in FIGURE 7 and the dial gauge 183 is positioned on its mounting 185 over contact pin 177 with its feeler pin 181 in contact with contact pin 177. The dial gauge is then set to zero, and the clearance between the heating mold flanges 149 is approximately determined with a feeler gauge or meter.

Sockets 173 may then be attached to plugs 165 and 171 to apply heating current to heating elements 145 of heating mold 135 from any suitable switching mechanism. As mold 135 heats, dial gauge 183 is monitored. A first movement may be noticed as the upper and lower halves 137 and 139 of heating mold 135 expand thermally and seat more securely around the rope 151 during the initial stages of heating. No great movement will then be noted until the temperautre of the mold approaches 300 Fahrenheit (when coating with a medium high temperature melting nylon) at which time movement becomes more pronounced. When the dial gauge indicates that the movement of the die halves as the plastic softens has eliminated approximately one half the gap between flanges 149 of the upper and lower halves 137 and 139 of heating mold 135 as shown in FIGURE 8, dial gauge 183 is swung out of the way and the heating current to mold 135 is discontinued.

The lower cold mold is next immediately raised by the operation of foot pump 33 until the lower surface 85 of upper cold mold 19 is seated over the upper half 137 of the heating mold 135 and spring supports 47 are compressed sufficiently to allow the upper surface 69 of lower cold mold 25 to contact the lower half 139 of the heating mold 135. It will be noted that in this position tie plates 93 will fit in notches 43 in the lower cold mold 25 and that the upper yokes 155 and guide pins 129 will fit into notches 45 in the upper cold mold 19. Pressure in the cylinders 11 and 13 is then increased until it reaches about 300 pounds per square inch for nylon coating when the halves of the heating mold will have been pressed into the position shown in FIGURE 9 and the nylon will have been compressed and molded as shown in FIGURE 9 into the interstices between the strands of the rope to form a very uniform, concentric coating.

Slight experimentation with other plastics will indicate the degree of dial movement and the final pressure which must be used to obtain superior coatings.

It will be noted in FIGURE 8 that a slight extrusion of plastic occurs as shown at 187 between the flanges 149 of the heating mold 135 at the end of the heating cycle. This extrusion continues during the cold molding compression cycle to give a final small flash 189 on the finished coating. The mold flanges 149 are heated by conduction from the remainder of the mold but due to their open ends, which readily conduct heat away, do not become as hot as the remainder of the mold. It has been found important to provide this relationship as the medium heating of the flanges promotes the initiation of flash which subsequently, because the flange is relatively cooler than the remainder of the mold, solidifies between the flanges to a progressively greater degree as it extrudes between them and, in effect, provides a plug between the flanges which opposes further loss of plastic from the mold and increases the molding pressure within the mold. In this manner all possible voids in the plastic about the central mold cavity about the rope 151 are filled and a much more uniform and compact coating is provided. It has been found that the provision of the flanges 149 and sufficient plastic material to provide at least a minimum flash 189 between them is necessary to obtain a satisfactory coating. A mold without the flanges will give an inferior coating even if sufficient plastic to provide a flash is present.

If desired cold molds 19 and 25 may be water cooled, but for most purposes it has been found that the mass of the mold supplies a sufficient heat sink and that the molds cool sufficiently by radiation between cycles if they are not used continuously over long periods.

It is important as pointed out above that the rope 154 be tensioned between clamps 97 and 101 not only to align the rope in the mold but also to pull the individual strands down tightly against each other as the rope is stretched so that the lubricating oil and other possibly deleterious material in the core of the rope is locked in the internal portions of the rope. We have found that if the rope is not so tensioned these internal materials may cook or otherwise escape to the surface of the wire rope and cause voids and imperfections in the coating.

Due to the stiffening of hot mold 135 by reinforcing ribs 147 short sections of plastic much shorter than the length of the heating mold 135 can be effectively heated and molded in the apparatus without loss of heat contact. For instance, plastic sections as short as one inch or less have been successfully molded in a mold twenty-four inches in length. This enables short damaged sections of plastic coating to be easily repaired or irregular long sections of rope to be conveniently covered by progressive applications of the mold along the rope.

We claim:
1. A molding device for molding a plastic coating over a flexible elongated member comprising:
    (a) first thin metallic heated mold means,
    (b) second relatively more massive cooled mold means positioned adjacent to but normally spaced from said first mold means,
    (c) said second mold means having an inside configuration substantially similar to the outside configuration of said first mold means,
    (d) said first and second mold means each being comprised of at least two sections,
    (e) biasing means to urge at least two sections of said first mold means relatively toward each other,
    (f) means to heat said first mold means while said second mold is spaced therefrom,
    (g) measuring means to detect movement of said two sections of said first mold means toward each other when plastic between said sections is heat softened, and
    (h) means to force said second mold means against said first mold means after a predetermined move- ment is detected by said measuring means to extract heat quickly therefrom and mold said plastic within said first mold means, 2. A molding device according to claim 1 additionally comprising:
(i) clamping means having spatially separated clamping positions to grip the flexible member on opposite sides of the area to be plastic covered to tension the flexible member in the mold.

3. A molding device according to claim 1 wherein said first heated mold means additionally comprises:
outwardly extending heat conducting parallel flanges.

4. A molding device according to claim 3 wherein said first heated mold means additionally comprises:
heating element means integrally connected with said first mold means intermediate said flanges and having a structure such that additional heating capacity is disposed near the longitudinal extremities of the mold.

5. A molding device according to claim 2 wherein the additionally clamping means comprises:
said clamping means being mounted in opposed positions upon a frame supporting said first molding means and said biasing means for said first molding means.

6. A molding device according to claim 5 wherein said heated mold means additionally comprises:
outwardly extending heat conducting parallel flanges, and
heating element means integrally connected with said first mold means intermediate said flanges and having a structure such that additional heating capacity is disposed near the longitudinal extremities of the mold.

7. A molding device for plastic comprising:
(a) at least two mold sections biased toward each other by a predetermined biasing pressure from a biasing means,
(b) heating means to heat the said mold sections,
(c) detecting means to measure a predetermined movement of said two mold sections toward each other when plastic between said sections is sufficiently heat softened for proper shaping, and
(d) means to forcibly move said mold sections toward each other to finally shape said plastic after said predetermined movement is measured.

8. A molding device according to claim 7 wherein the plastic is shaped over a helically twisted wire structure having a lubricated core additionally comprising:
(e) clamping means to initially tension said wire structure within said mold sections to lock the lubrication in said core during heating and shaping.

References Cited
UNITED STATES PATENTS

| | | | |
|---|---|---|---|
| 2,373,201 | 4/1945 | Smith | 18—17 |
| 2,425,831 | 8/1947 | Roganek | 18—36 |
| 2,425,832 | 8/1947 | Lubbert et al. | 18—36 |
| 2,441,988 | 5/1948 | Brillhart et al. | 18—36 |
| 2,454,193 | 11/1948 | Martin | 18—36 |
| 2,532,501 | 12/1950 | Johnson | 18—17 X |
| 2,874,751 | 2/1959 | Norton | 18—17 X |
| 3,103,704 | 9/1963 | Stein et al. | 18—36 |

J. HOWARD FLINT, JR., *Primary Examiner.*

U.S. Cl. X.R.

18—36